June 27, 1967          G. DOIG          3,327,733
AIR CONTROL SYSTEM
Filed June 21, 1965          5 Sheets-Sheet 1
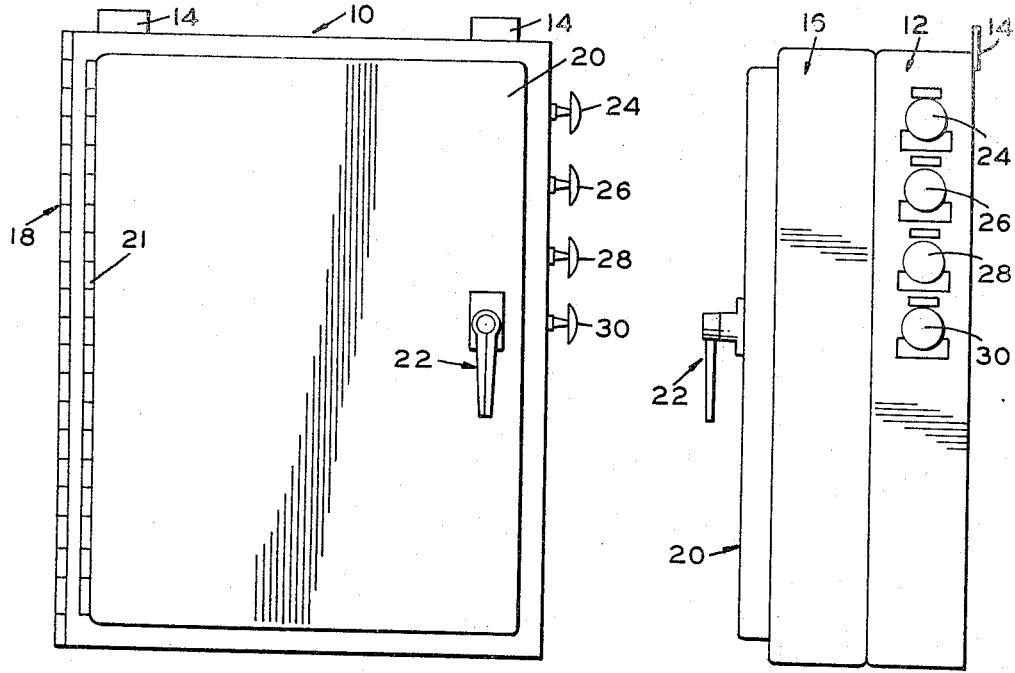
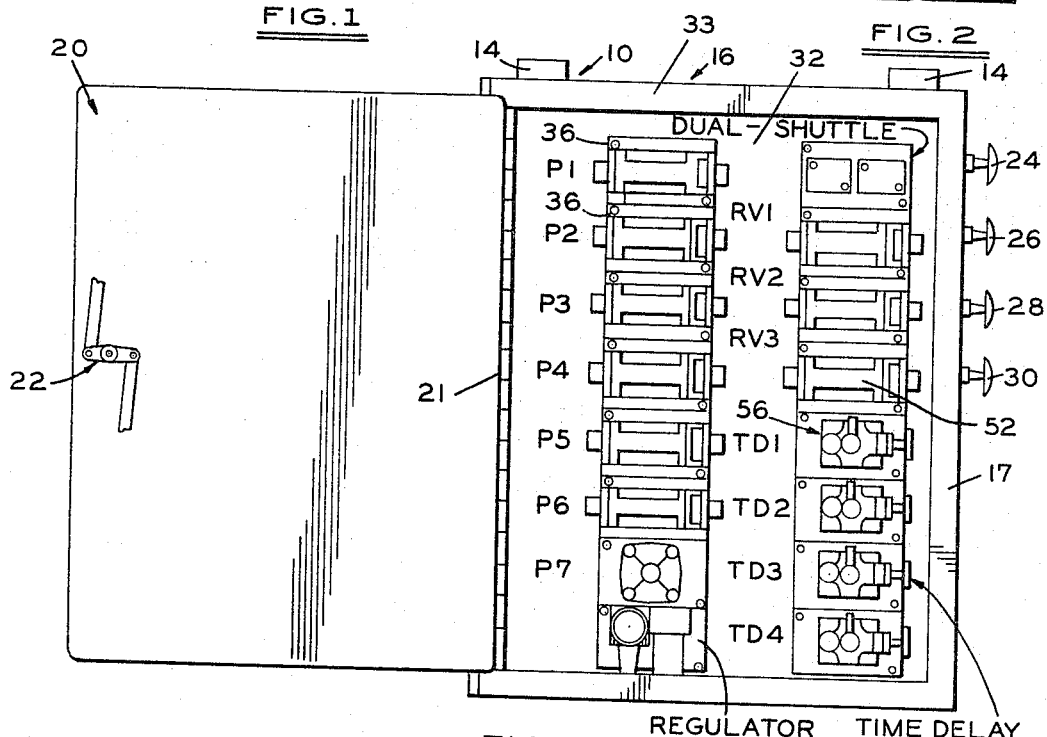
INVENTOR.
GEORGE DOIG
BY Barnes, Kisselle, Raisch & Choate
ATTORNEYS

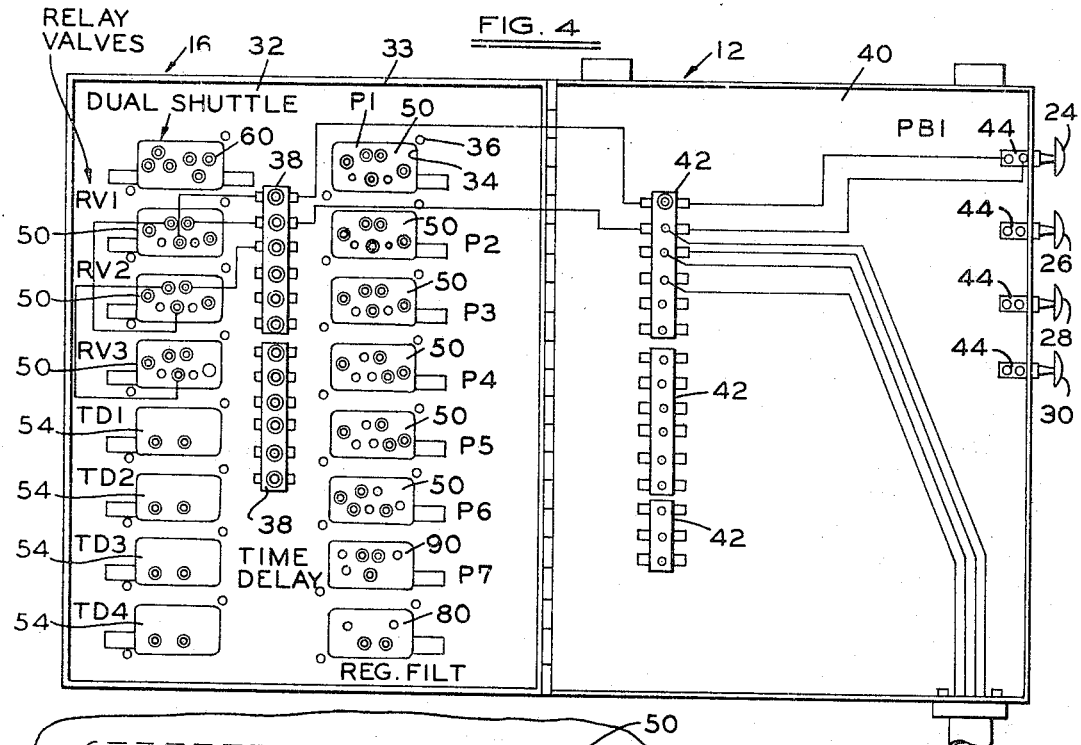
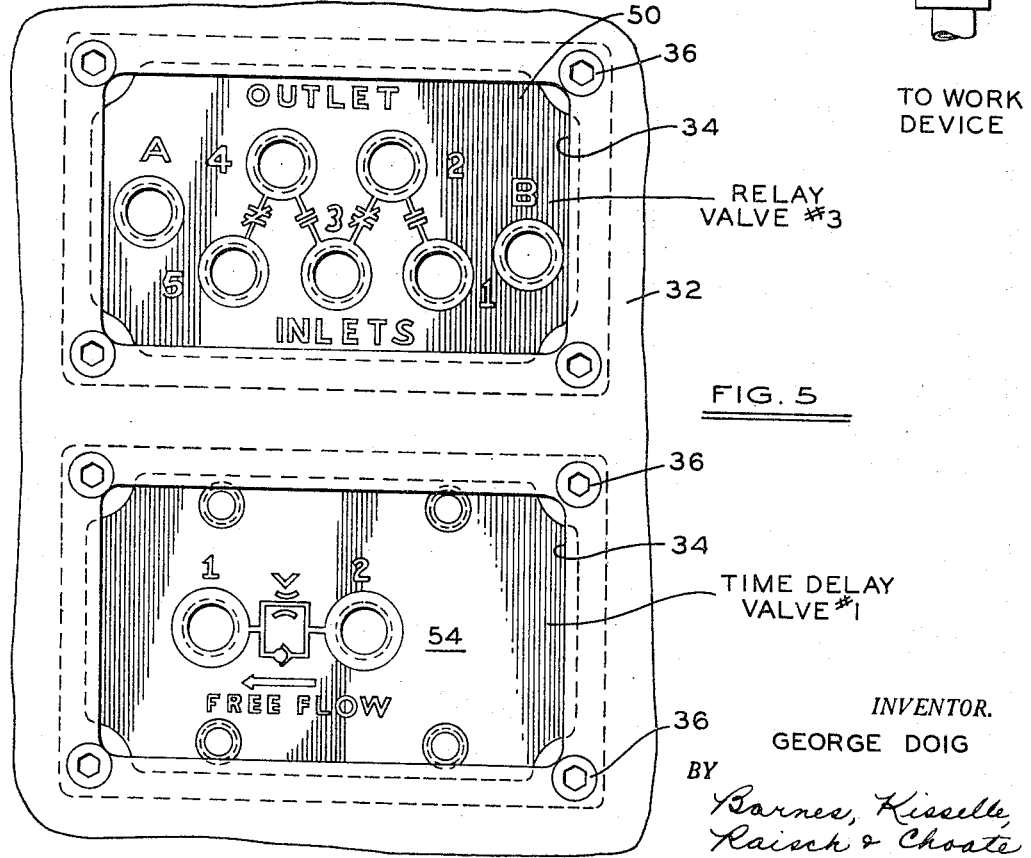

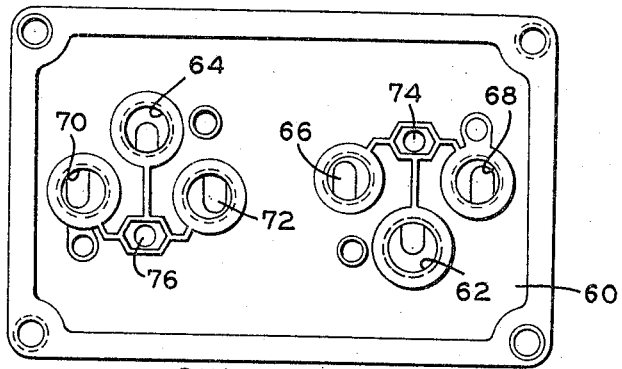
FIG.6 DUAL SHUTTLE
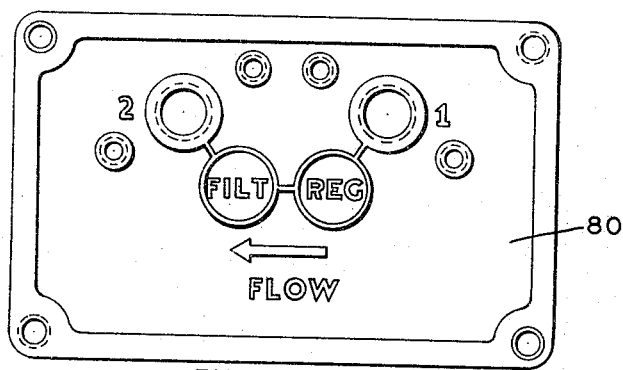
FIG.7 FILTER REG.
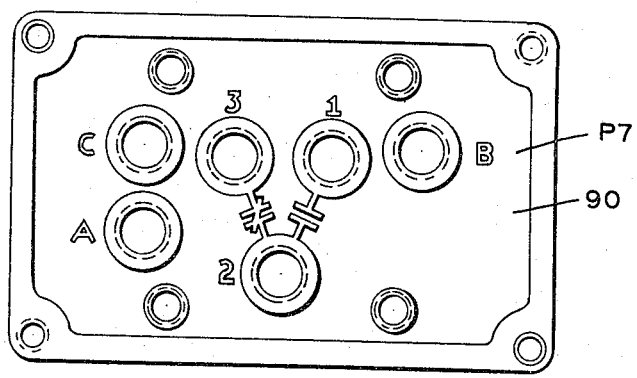
FIG.8 RELAY VALVE

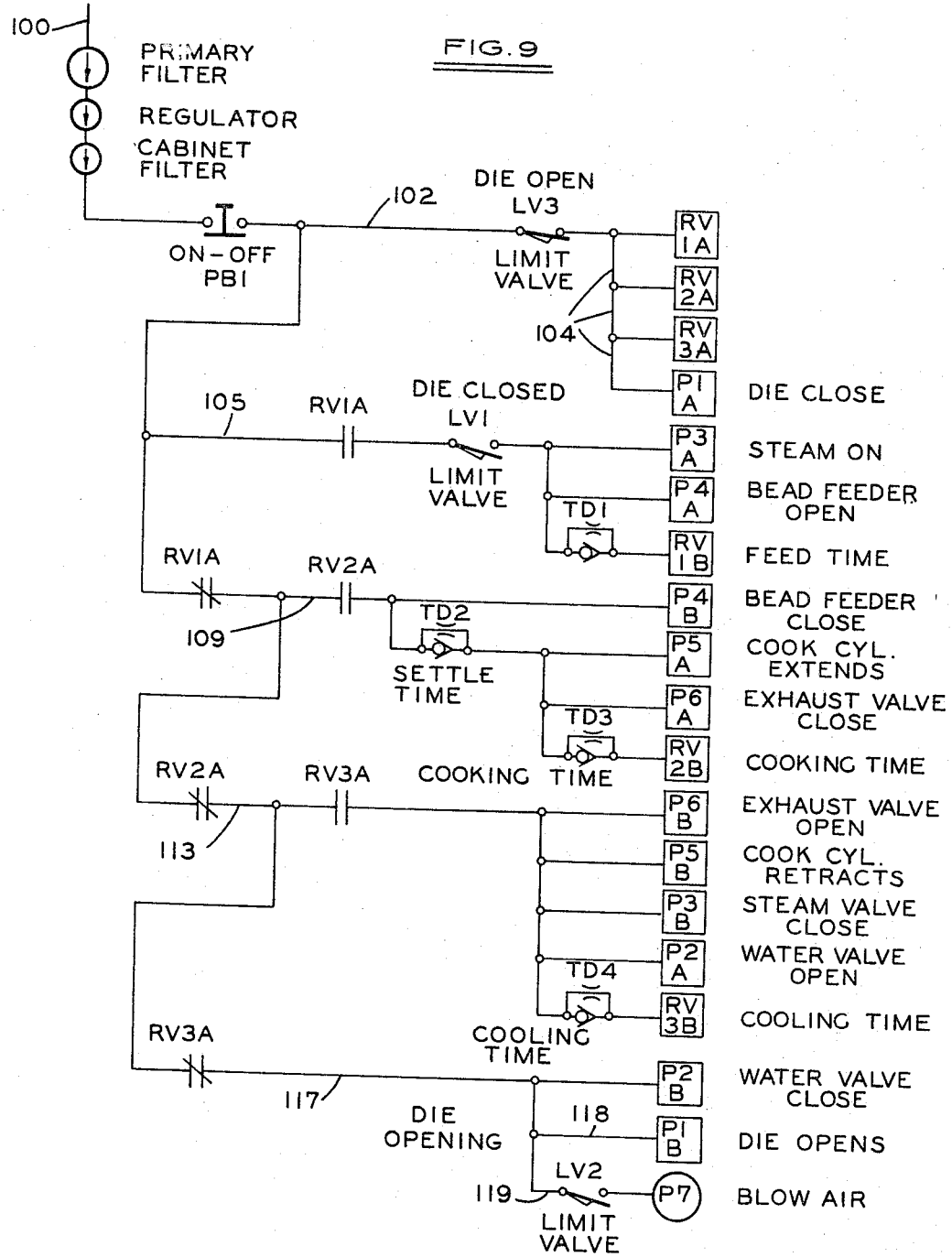

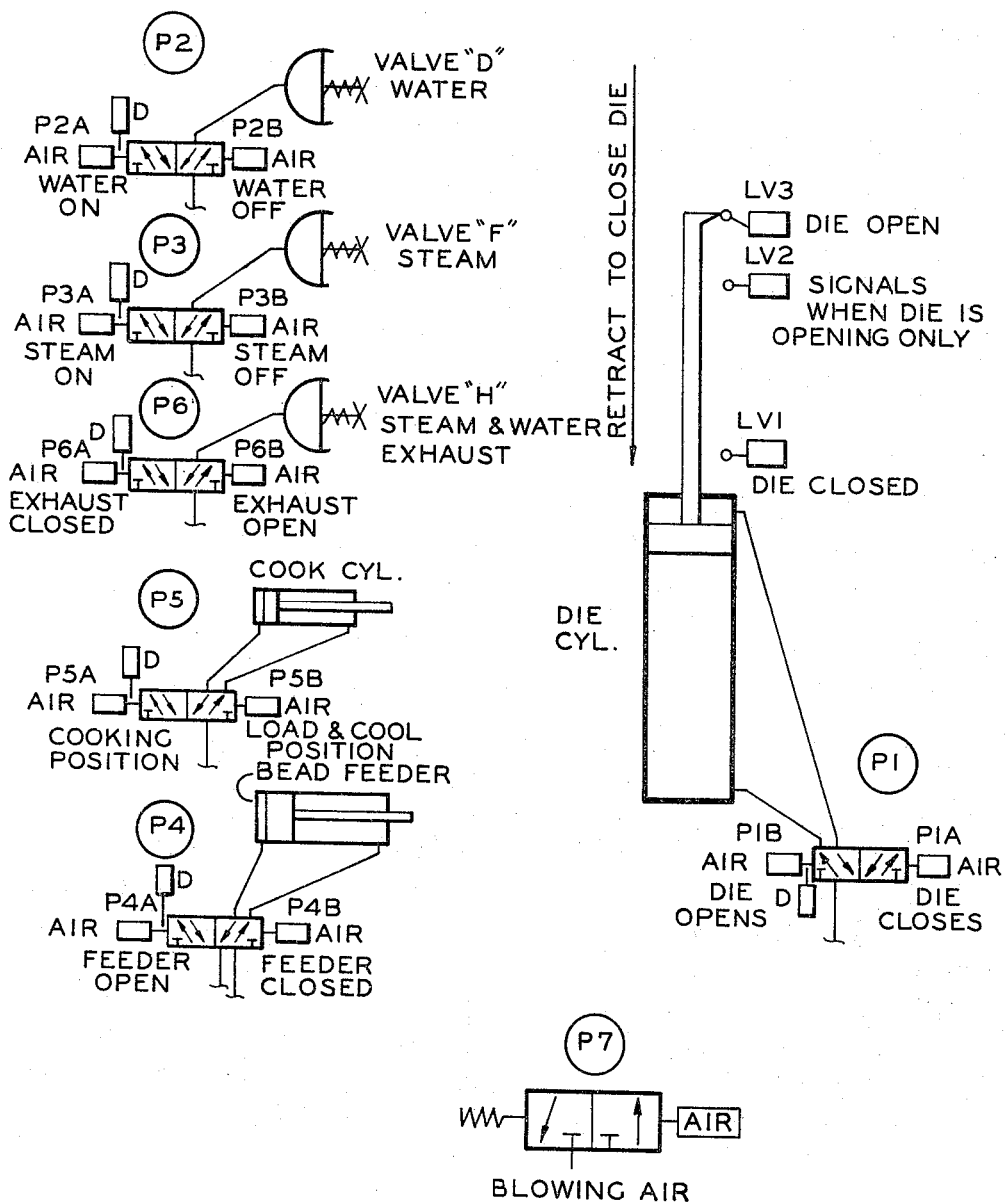

United States Patent Office

3,327,733
Patented June 27, 1967

3,327,733
AIR CONTROL SYSTEM
George Doig, Highland, Mich., assignor to Numatics, Incorporated, Highland, Mich., a corporation of Michigan
Filed June 21, 1965, Ser. No. 465,283
7 Claims. (Cl. 137—552)

This invention relates to an air control system, more particularly to a mechanism for mounting housing and circuiting air control valves so that the system is adaptable to a multitude of different circuits and is so set up that any ordinary mechanic can install the various elements and follow with ease the circuitry of the system.

In the creation and installation of valve circuits, it frequently happens that a particular valve housing may perform several different functions depending on what valve spool is installed in it. Accordingly, valves which look alike in the outside may perform different functions. A problem also arises when workmen setting up a circuit are not totally familiar with the valves or their functions.

It is an object of the present invention to provide a valve mount assembly which greatly facilitates the circuitry required in the way of tube connections and which is so designed that a workman or an operator may readily determine the function of each valve in the circuit and properly install it or check it.

This is accomplished by utilizing a mounting panel in a control box which provides on one side a space for mounting valves and which is windowed so that the rear face of the valves will be visible and accessible from the rear face of the panel, each valve having thereon indicia to indicate its function so that it may be readily incorporated in and connected to a planned circuit. The valves are designed for circuit connections at this accessible rear face which also greatly enhances the ease in which the circuit may be arranged and serviced.

Additional objects, features, and advantages of the system as well as further explanation of the principle thereof will be found in the following description and claims.

Drawings accompany the disclosure and the various views thereof may be briefly described as follows:

FIGURE 1, an outside view of a control panel housing.
FIGURE 2, a side view of the control panel housing.
FIGURE 3, a view of the control panel housing with the outside closure door opened.
FIGURE 4, a view of the control panel housing showing the second closure member in open position.
FIGURE 5, a view of a portion of the valve mount panel (second closure) of the valve housing illustrating the visible indicia system.
FIGURES 6, 7 and 8, views of the indicia plate of additional valve units which may be used in the system.
FIGURE 9, a view of a circuit diagram actually incorporated in the valve units illustrated in FIGURE 4.
FIGURE 10, a diagrammatic presentation of the motor cylinders and control valves used with the control panel.

The present apparatus and system is directed to the provision of a control system for fluid-operated motors which is of such a nature that, if desired, no electrical components need be used. With such an arrangement, the device can be used where electrical power is unavailable, it being possible to provide air pressure by utilizing internal combustion operated compressors. The absence of electrical structures also makes the system independent of electrical voltage variations or power failures and simplifies the servicing of the unit.

As shown in the drawings, the control panel housing 10 is composed of a rear compartment 12 mountable on a suitable support 14. Mounted on this rear compartment 12 is a composite forward closure and compartment 16 hinged at 18. A front closure panel 20 hinged at 21 and operated by a locking handle 22 is provided as a first closure member for the housing. External control valves 24, 26, 28 and 30 have handles projecting from the edge of the back compartment 12 so that they may be manually operated when the housing is closed.

In FIGURE 3, the housing is shown with the first closure member 20 open exposing the interior of the second closure housing 16. This closure housing 16 contains a panel 32 positioned at the rear of the frame 33 which forms the housing 16. The panel 32 is provided with a plurality of apertures or windows 34 shown best in FIGURES 4 and 5 arranged, one above the other, in a double row, there being eight apertures in each row in the embodiment shown. Panel 32 is a supporting panel for a plurality of control valve housings each of which is bolted by screws 36 to the panel 32. Also, on the rear of the panel 32 are two aligned blocks 38 each containing a plurality of connector nipples to facilitate the application of connector tubes. On the rear panel 40 of the rear housing 12 are additional blocks 42 containing connector nipples. Also in FIGURE 4, the control valves 44 operated by the external handles 24, 26, 28 and 30 are shown.

In FIGURES 5, 6, 7 and 8, the rear surface of the valve block of specified control valves are shown. These surfaces are provided with openings for the connection of connector tubes and are also provided with indicia to indicate the particular function of the valve. For example, the rear surface of a valve block 50 is shown with pilot-control openings A and B and with a pressure inlet 3 leading alternatively depending on valve position to a cylinder outlet 2 and a cylinder outlet 4, the exhaust passages being shown respectively at 1 and 5. The valve structure utilized with this block 50 is shown in FIGURE 3 at 52, a standard four-way valve. In the lower portion of FIGURE 5 on the panel 32 is shown the back surface of a valve block 54 mounting a time-delay valve 56 (FIGURE 3) having a free flow in one direction from 2 to 1 and a controlled flow in the other direction from 1 to 2.

In FIGURE 6, the rear side of a valve block 60 is shown, this block serving as a mount for a double shuttle valve having constantly opened exhaust passages 62 and 64, respectively, optionally open to inputs 66 and 68 for 62 and 70 and 72 for 64. The shuttle valves are diagrammatically illustrated at 74 and 76. This shuttle valve may be used in a control circuit but is not incorporated in the example circuit of FIGURES 9 and 10.

In FIGURE 7, the rear side of a valve block 80 is illustrated, this block serving as a mount for a combination filter and pressure regulator with an inlet 1 to the regulator and an outlet 2 from the filter which has received air from the regulator output. The front structure of this valve combination is shown in FIGURE 3.

In FIGURE 8, the rear side of a valve block 90 has pilot control openings A and B with the block serving as a mount for a three-way valve capable of directing pressure from port 2 to port 1 or 3. As shown diagrammatically in FIGURE 10, this is a valve P7 used for blowing air and is operated by a spring in one direction and pilot air in the other direction.

As shown in FIGURE 4, the various ports of the valves may be connected by plastic flexible tubing to the ports of connector block 38 and then over to connector blocks 42 and from there to control valves and to the machine cylinders and limit valves on the machine. Only a few connections are shown to avoid confusion in the presentation.

In FIGURE 9, a circuit diagram is illustrated for a particular plastic molding operation and in FIGURE 10 certain air-operated control valves which are operated by the control circuit are illustrated. In FIGURE 10, there appears diagrammatic showings of seven operating valves P1, P2, P3, P4, P5, P6 and P7. These valves are also shown in FIGURES 3 and 4. Valve P1, for example, receives control air at P1A, the right end, for one position and at P1B, the left end, for another position. In FIGURE 9, the block P1A marked "Die Close" receives air from the inlet line 100 through the Primary Filter, Regulator, and Cabinet Filter, the Manual On-Off Valve PB1 (valve 44, FIGURE 4), line 102, Limit Valve LV3 and branch line 104.

The starting conditions for the circuit are:

(1) The Die piston (FIGURE 10) is extended, holding the die open.
(2) Water Valve D is closed.
(3) Steam Valve F is closed.
(4) Steam and Water Exhaust Valve H is open.
(5) Cook Cylinder is retracted.
(6) Blowing Air Valve is closed.

The mechanical sequence for the circuit is:

(1) Die closes.
(2) When Die is closed, Steam Valve and Bead Filler open.
(3) After Filling Time has elapsed, Bead Filler closes.
(4) A short time delay before—
 (a) Cook Cylinder extends.
 (b) Steam and Water Exhaust Valve closes—Start Cooking time.
(5) At conclusion of Cooking Time—
 (a) Cook Cylinder retracts.
 (b) Steam and Water Exhaust Valve opens.
 (c) Water Valve opens—Start Cooling Time.
(6) When Cooling Time is complete—
 (a) Water Valve closes.
 (b) The Die is opened.
(7) When the Die is nearly fully opened, an Ejector Air Blast is applied to the lower mould.
(8) Cycle repeats.

The sequence of the control functions is as follows:

(1) PB1 being actuated, air is passed through LV3 (held passing by open Die) to RV1, RV2, RV3 and P1.

(2) P1 causes Die to lower or close, actuating LV1 when closed. RV1 now passing (on line 105), P4 is opened to fill mould with beads, the Steam Valve P3, is opened and the filling time starts, TD1.

(3) As TD1 times out, it activates RV1 to break line 105 and make on line 109. The Bead Filler closes and TD2 is invoked to allow a settling time (via RV2).

(4) When TD2 times out, P6, the Exhaust Valve, closes, and the Cook Valve, P5, is opened. The Cooking Time now starts, TD3.

(5) TD3 times out and activates RV2 to break line 109 and make line 113. The Exhaust Valve opens and the Cook Valve closes.

(6) Line 113 now being made via RV3, the Timer TD4 now allows a cooling time to elapse before causing RV3 to function. P2, the Water Valve, opens and P3, the Steam Valve, closes, immediately the Cooking Time is completed by by-passing the Timer.

(7) When the Cooling Time has elapsed, RV3 breaks line 113 and makes on line 117, closing water valve P2, and closing valve P1, thus opening the die.

(8) The opening die actuates LV2 which opens P7, providing an air blast to clear the die of the moulded device.

The above is an example of a circuit which can be incorporated in the control panel using the relay valves, time delay valves, and controls, all panels mounted in a manner to facilitate easy assembly and circuit hook-up.

The indicia on the rear faces of the valves mount blocks, as shown in FIGURES 5, 6, 7 and 8 is preferably cast into the surface as raised figures to facilitate easy reading. It is preferable that the background below the figures be painted a dark color to contrast with the metallic color of the indicia. Each line connection can bear a number to facilitate the connection of the air tubes which can also be numbered. See numbers 1, 2, 3, 4, 5 in FIGURE 5 for relay valve #3.

It will be understood that the invention in the present case does not lie in the particular circuit shown in FIGURES 9 and 10 but rather in the manner in which the valve units are marked and mounted to facilitate the hook-up of the circuit and to reduce the time of assembly by either skilled or unskilled persons to a fraction of that previously required. In addition, the circuit is such that any focal point of difficulty can readily be located and remedied by simple valve replacement.

The accessibility of the connection ports in the rear faces of the valves permits the use of flexible fluid hose lines between the connection ports of the valves and the valve blocks 38 and the valve block 42 and also to the accessible manual control valves 24 in the back panel box. These lines can then connect through a common opening in the frame 12 to work devices located remotely of the panels. The flexible lines permit ready movement of the frame 16 and panel 32 relative to the back frame which is preferably mounted in a stationary position.

What is claimed as new is:

1. In a fluid control system of the type utilizing valves for controlling and directing fluid to a plurality of work devices, that improvement which comprises:
 (a) a mounting panel mounted for accessibility from the front and obverse faces having a plurality of openings therein,
 (b) a plurality of valves having different control functions to mount on said panel each having a connection face to mount against said panel overlying one of said openings,
 (c) means to mount said valves adjacent said openings, and
 (d) indicia means on the connection face of each valve observable from the obverse face of said panel when mounted on said panel showing the function of the particular valve.

2. In a fluid control system of the type utilizing valves for controlling and directing fluid to a plurality of work devices, that improvement which comprises:
 (a) a mounting panel mounted for accessibility from the front and obverse faces having a plurality of openings therein,
 (b) a plurality of valves having different control functions to mount on said panel each having a connection face to mount against said panel overlying one of said openings,
 (c) means to mount said valves adjacent said openings, and
 (d) indicia means on the connection face of each valve observable from the obverse face of said panel when mounted on said panel showing the function and connection ports for each valve.

3. In a fluid control system of the type utilizing valves for controlling and directing fluid to a plurality of work devices, that improvement which comprises:
 (a) a mounting panel mounted for accessibility from the front and obverse faces having a plurality of relatively large openings therein,
 (b) a plurality of valves having different control functions to mount on said panel each having a connection face with a plurality of connection ports to mount against said panel overlying one of said openings,
 (c) means to mount said valves adjacent said openings, and
 (d) indicia means on the connection face of each valve indicating the flow function of each valve in relation to connection ports opening to said face and observable from the obverse face of said panel.

4. In a fluid control system of the type utilizing valves for controlling and directing fluid to a plurality of work devices, that improvement which comprises:
 (a) a control box having a back panel and frame, (b) a second frame hingedly mounted on said back frame and a mounting panel carried by said second frame, said mounting panel having a plurality of relatively large openings therein, (c) a cover panel hingedly mounted on said second frame to close said second frame from one side, (d) a plurality of valves having different control functions to mount on said mounting panel each having a connection face with a plurality of connection ports to mount against said mounting panel overlying one of said openings, (e) means to mount said valves adjacent said openings, and (f) indicia means on the connection face of each valve indicating the flow function of each valve in relation to the connection ports openings to said face and observable from the rear side of the second frame to facilitate connection of the valves in a control circuit.

5. A control system as defined in claim 4 in which the control box has a valve mounted thereon for manual operation outside said box and control lines leading from said box to outside work devices.

6. In a fluid control system of the type utilizing valves for controlling and directing fluid to a plurality of work devices, that improvement which comprises:

(a) a mounting panel mounted for accessibility from the front and obverse faces having a plurality of relatively large openings therein, (b) a plurality of valves having different control functions to mount on said panel each having a connection face dimensioned slightly larger than corresponding opening in said mounting panel wherein the margins of said face will overlie the margins of an opening while the main portion of said face will be exposed through said opening, (c) means to mount said valves at the margins of said openings, and (d) indicia means on the connection face of each valve indicating the flow function of each valve in relation to connection ports opening to said face and observable from the obverse face of said panel.

7. In a fluid control system of the type utilizing valves for controlling and directing fluid to a plurality of work devices, that improvement which comprises:

(a) a control box having a back panel and frame, (b) a second frame hingedly mounted on said back frame and a mounting panel carried by said second frame, said mounting panel having a plurality of relatively large openings therein, (c) a cover panel hingedly mounted on said second frame to close said second frame from one side, (d) a plurality of valves having different control functions to mount on said mounting panel each having a connection face with a plurality of connection ports to mount against said mounting panel overlying one of said openings, (e) means to mount said valves adjacent said openings, (f) indicia means on the connection face of each valve indicating the flow function of each valve in relation to the connection ports opening to said face and observable from the rear side of the second frame to facilitate connection of the valves in a control circuit, (g) connection blocks mounted on the inner face of said back panel and on the rear side of said mounting panel, and (h) a plurality of sections of flexible fluid lines connecting connection ports of said valves and said connecting blocks to permit movement of said panels relative to each other without disturbing connections of said valves to each other and to outside work devices.

References Cited
UNITED STATES PATENTS
2,689,584   9/1954   Dreyfuss _____ 137—552

M. CARY NELSON, *Primary Examiner.*